Jan. 24, 1967 R. L. FILLMORE ETAL 3,300,696
TRACER CONTROL APPARATUS WITH MEANS TO
CORRECT POSITION ERROR
Filed Oct. 15, 1963 2 Sheets-Sheet 1

INVENTORS
ROBERT L. FILLMORE,
RICHARD C. FLOM,
BY ROYAL R. HAWKINS

Francis A. Sirr
ATTORNEY

United States Patent Office 3,300,696
Patented Jan. 24, 1967

3,300,696
TRACER CONTROL APPARATUS WITH MEANS TO CORRECT POSITION ERROR
Robert L. Fillmore, Mound, Richard C. Flom, Minneapolis, and Royal R. Hawkins, Bloomington, Minn., assignors to Honeywell Inc., a corporation of Delaware
Filed Oct. 15, 1963, Ser. No. 316,247
8 Claims. (Cl. 318—19)

This invention relates to tracer control apparatus, and more particularly to an improvement of tracer control apparatus for automatic control of tool machines having two mutually perpendicular axes of control, which tracer control apparatus provides more accurately speed or trace rate control than has heretofore been possible.

An example of such a tracer control apparatus utilizes a tracer head deflection signal, having both a magnitude and a phase angle, as the primary control signal for the control apparatus. The tracer head includes a stylus which engages and is biased against a templet to be traced, to produce a given deflection of the stylus. The amount of biasing determines the magnitude of the tracer head deflection signal, whereas the direction of movement of the stylus, as a result of this biasing, determines the phase angle of the signal. This tracer head deflection signal, so produced, can be defined as an "out" signal.

A control means is provided to generate an "in" signal of a fixed magnitude, this magnitude controlling the biasing and establishing the given deflection of the stylus as it engages the templet. The phase angle of this "in" signal is referenced to the "out" signal and is exactly 180° displaced from the "out" or tracer head deflection signal. The "in" signal and the "out" signal are added to produce a further signal which is then resolved into two quadrature components to control the machine tool in its two axes of movement. The resultant movement of the machine tool causes the stylus of the tracer head to be biased against the templet to produce the required deflection, and the "out" signal is made to be exactly equal and opposite to the "in" signal.

The tracer control apparatus, capable of use with a machine tool having control of movement along the two mutually perpendicular axes, utilizes these axes as a reference quadrature coordinate system. The phase angle of the tracer head deflection signal is referred to this coordinate system in determining the numerical value of this phase angle. The difference between the magnitudes of the "in" and "out" signals is resolved into two quadrature components, utilizing the sine and cosine relationship of the above mentioned phase angle. The quadrature components then control movement of the machine tool along its respective quadrature axes to produce relative movement of the tracer head stylus and the templet, and thus reduce this difference in magnitude between the "in" and "out" signals.

A speed control, that is a trace rate for moving the tracer head stylus tangentially to the templet at the point of engagement, is normally introduced by a means which first senses the phase angle of the tracer head deflection signal, and then generates a speed signal of a magnitude dependent upon a selected or program speed and of a phase angle which leads or which lags the phase angle of the tracer head deflection signal by 90°, for clockwise or counterclockwise trace around the templet respectively. Thus, the phase angle of the speed signal is always tangential to the templet at the point of engagement of the stylus, this angle also being referenced to the quadrature axes of the machine tool.

Since the machine tool can move only along the two perpendicular machine tool axes, this speed signal (always tangential to the templet) must also be resolved into two quadrature components, one along each axis of the machine tool. These two components of the speed signal are then used to also control movement of the machine tool along the two axes at rates to produce the required trace rate of the tracer head stylus tangential to the templet.

The present invention achieves more accurate speed or trace rate control than has heretofore been available, and specifically achieves this result by the use of an instrument system whose mechanical loading is light, constant, and uniform. In this manner, we utilize an instrument system to originate what can be called a "position" signal and this position signal is referenced to the actual position of the final drive means of the machine tool by means of a position control loop. If a position error exists, correction is made to more accurately control the speed of trace.

The structure of our invention utilizes the resolved quadrature signals, which result from a difference in the "in" and "out" signals, to directly control the two axes of movement of the machine tool. In order to introduce a trace rate, however, we combine the difference of the "in" and "out" signals with a "speed" signal to control the instrument system and derive from the instrument system a pair of quadrature resolved speed outputs, one for each axis of the machine tool. By virtue of the fact that the instrument system is capable of precise and accurate control, and since its loading is light, constant, and uniform, these speed outputs are exactly indicative of the desired trace rate of each axis of the machine tool. Each speed output of the instrument system and each axis of the machine tool is then provided with a synchro, and an interconnection of these synchros provides a position error signal which is connected to control each axis of the machine tool in a manner to reduce such a position error signal.

Thus, the speed of trace is held to a close tolerance, as determined by the characteristics of the instrument system, rather than by the characteristics of the machine tool itself.

Specifically, we control the input to the instrument system by originating quadrature components of the vector sum of the above defined "in" and "out" signals and of the "speed" signal. These quadrature components are then modified by a speed command to provide two quadrature components of speed, one component for each axis of the machine tool.

Moreover, the speed command is provided by means including portions of the instrument system. In this manner a much wider range of speed command is possible because of the wide range of adjustment which is possible with the instrument system. These two components are then applied as position signals to the two axes of control of the machine tool through the use of a unique position control loop. The position control loop is utilized to compare the position of each of the quadrature outputs of the instrument system to the actual position of the individual final drive means for each quadrature axis of the machine tool. If a positional error exists, a correction factor is applied to the final drive means of the machine tool to correct the position or the rate of desired position change along the axes of the machine tool.

The present invention will be apparent to those skilled in the art upon reference to the following specification, claims, and drawing, of which;

Our improved tracing control system is shown basically in block form since its individual components are conventional. Our system is basically an improvement over the automatic duplicating control apparatus shown in the patent to J. J. Rudolf, Jr., et al. 2,962,645, dated November 29, 1960. It includes a tracer head of the type shown in the Rudolf and Sanderson Patent No. 2,941,140, dated June 14, 1960, which, when engaging the templet, provides an electrical output signal therefrom which is variable in magnitude depending upon the extent of the tracer stylus displacement, and is variable in phase depending upon the direction of stylus displacement relative to the dual axes of the machine tool.

Figure 1:
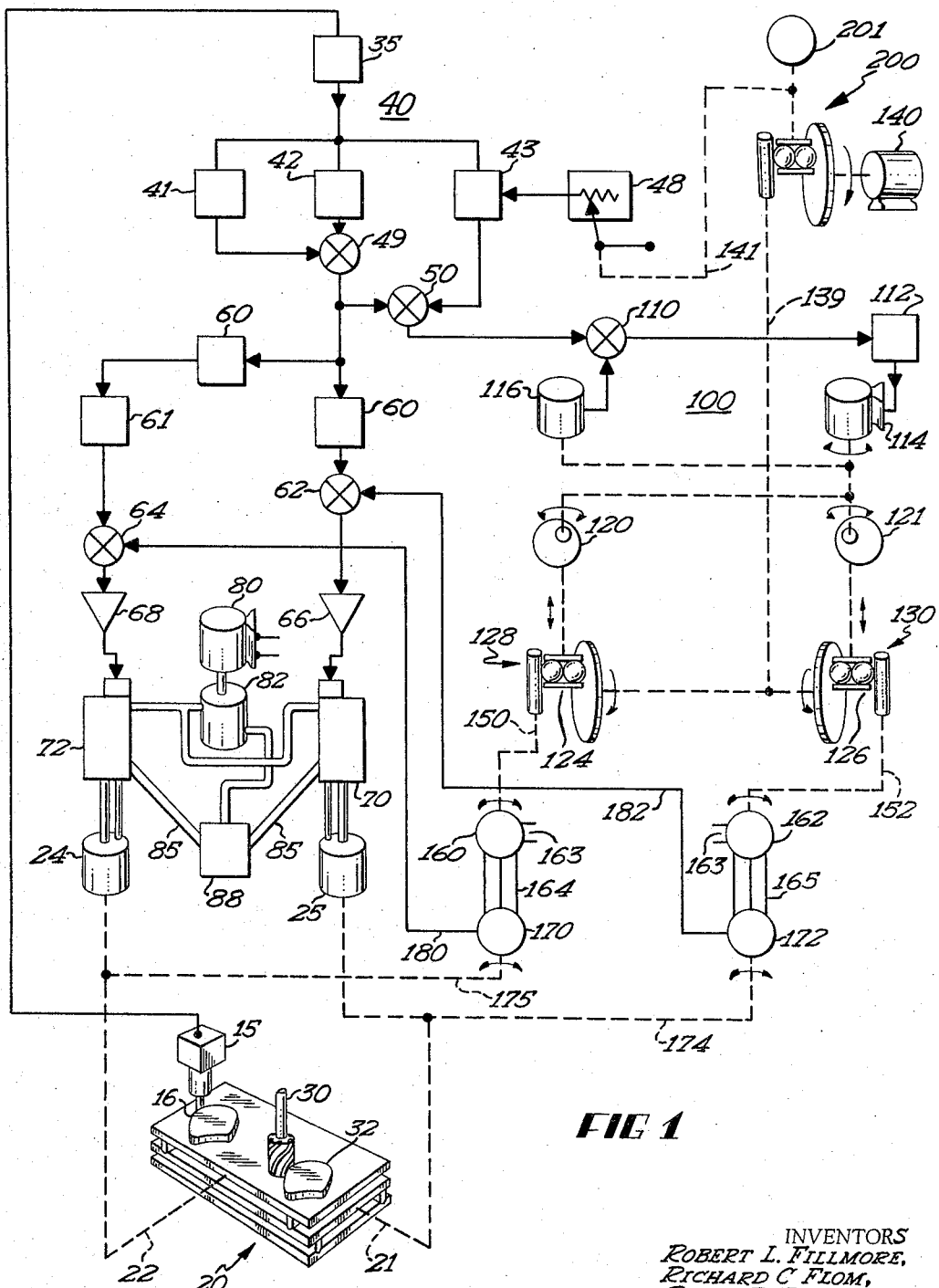
FIGURE 1 is a showing of an embodiment of our invention.
Figure 2:
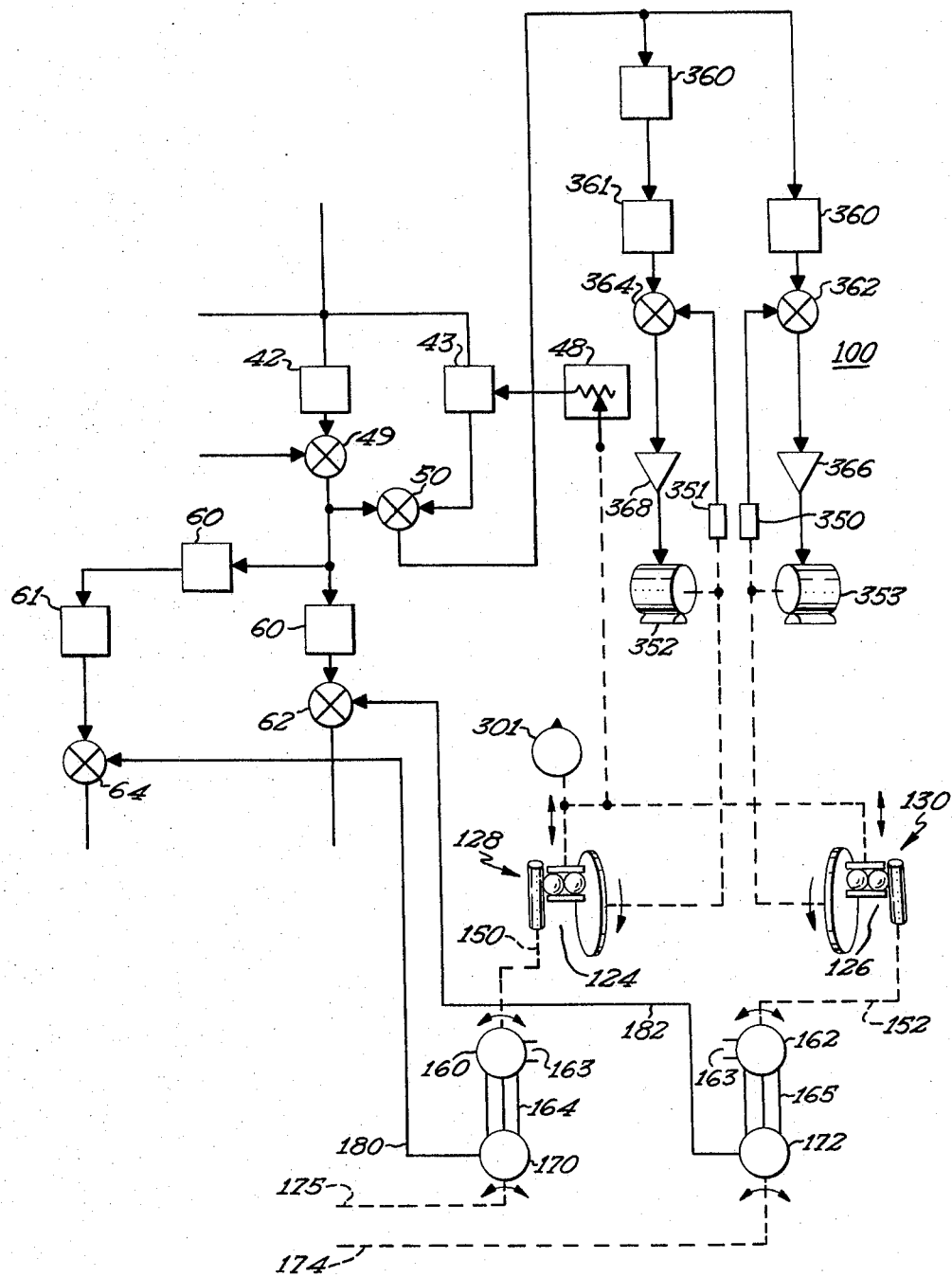
FIGURE 2 is a showing of a second embodiment of our invention.

In the drawings like elements are identified by the same reference numeral in both FIGURES 1 and 2. The tracer head 15 is shown schematically engaging a templet 16 mounted on a table or work bed 20 shown schematically as indicative of a work surface of a machine tool. This table is designed to be displaced in a pair of quadrature axes indicated by the dotted lines 21, 22, which table components are moved relative to one another to provide relative movement between the templet and stylus through suitable machine tool final drive means in the form of drive machines 24, 25. While we have chosen to show hydraulic machines, these machines may take other forms, for example electrical. For purposes of the present disclosure, the table is also shown as including a cutting tool 30 associated with the work piece 32 mounted on the table such that the cutting tool will follow and work the work piece as the tracer follows and engages the templet 16 through relative displacement of the table components along the axes 21, 22.

As shown schematically in the drawings, the output of the tracer head (the "out" signal) is connected through a preamplifier and filter network indicated generally at 35 into a multiple channel control network indicated generally at 40. This multiple channel control network is designed to modify the output of the tracer head in the same manner as that outlined generally in the above identified Rudolf Patent 2,962,645. For purposes of the present disclosure, the network would include an "in" and "out" signal means indicated generally at 41 and 42 to provide an error signal at a summing point, indicated generally at 49, which error signal is directly proportional in magnitude to the difference in the "in" and "out" signal magnitudes, and has a phase indicative of the direction of displacement of the tracer head.

As will be later noted, the "in" and "out" phase components form a single error component which is resolved into two quadrature components, one of which operates on each of the drive axes, that is motors 24, 25, to maintain a constant deflection or predetermined deflection of the tracer head.

In order to provide for movement of the tracer head along the templet, it is necessary to introduce a forward (clockwise) or backward (counterclockwise) speed or velocity vector signal component, which signal component will bear a 90° phase relationship to the phase of the signal from the tracer head. The magnitude of the velocity vector may be fixed, may be variable, or may be programmed to provide gain control.

Thus, as shown in block in the drawing, and as outlined in the above referenced patent to J. J. Rudolf, Jr., et al., this velocity component is obtained through a modifying network 43 or phase shift apparatus with provisions for varying the magnitude of this velocity component as indicated by secondary network 48 connected thereto. This velocity signal is connected to the summing point 50 along with the output from summing point 49.

A similar arrangement for introducing a velocity component to a contouring system is also outlined in N. G. Branson patent on tracer control systems, No. 2,492,731 dated December 27, 1949. In the prior art, however, the summed signal (in, out, and velocity) is connected directly to the drive channels or the drive motors 24, 25 for positioning the component parts of the machine tool or table 20 to provide for the predetermined relationship between the tracer head 15 and templet 16, and consequently the cutting tool 30 and work piece 32. However, certain errors in the velocity component are introduced through the motive equipment and the loads of the machine tool to cause variation between the actual velocities and the ideal velocities along the displacement axes of the machine tool. Further, the range of speed control with the variable electrical speed or velocity signal is limited due to the inability to sense errors in velocity at very low speeds and at the same time to maintain adequate loop gain with proper system stability.

In the present invention, a separate speed control in the form of an instrument system and a position control loop is provided to achieve control of velocity at all speeds in each axis of the machine tool and to permit a wide speed range of controls.

In FIGURE 1 the instrument system includes a pair of integrating means, shown as ball-disc integrators, having a speed signal input. A servo loop is provided to sense the phase angle of the vector sum of the "in," "out" and "speed" signals, and to control a pair of cams which bear a sinusoidal and cosinusoidal relationship in accordance with this phase angle. The respective angles of position of the two cams are used to control the respective positions of the ball portions of the ball-disc integrators. The speed portions of the ball-disc integrators are driven at a speed which is variable with the magnitude of the speed signal. Thus, the output of each of the ball-disc integrators is indicative, respectively, of a desired rate of trace or speed along the individual quadrature axes of movement of the machine tool.

The output of these integrators is then applied, through a position control loop, to the individual axes of control of the machine tool to derive a position error signal in the event the instantaneous position of the machine tool does not correspond to the instantaneous position of the output of the ball-disc integrator.

The output of the integrators is specifically connected to a position control loop in the form of two synchro systems in which each transmitter is connected to be driven by the output of one of the ball-disc integrators, and each receiver is connected to be driven by the final drive means of the machine tool. Therefore, the positional relationship between the transmitter and receiver is a position signal. If the final drive means of the machine tool drives the machine tool at the desired rate, an operational position signal is generated to produce the required trace rate. However, if, due to machine characteristics, the final drive means does not drive the machine tool to produce the desired trace rate, then the position signal is altered, as a feedback component, and is fed back into the control means for the machine tool final drive means to correct the speed and to thus produce the required trace rate. In this manner accurate trace rate is achieved.

Should the final means for one axis of the machine tool tend to drive slightly faster or slower than that required by the then existing velocity of the final drive means of the other axes of the machine tool, and by the then engaged contour of the templet, the phase angle of the signal controlling the instrument system (the vector sum of the "in," "out" and "speed" signals) will change so as to change the cam angle of the two ball-disc integrators, and hence change the speed of both of the machine final drive means. This speed will be changed in such a manner that the relative movement will be restored to a tangent to the templet at the then engaged contour of the templet, with the stylus deflection maintained nearly constant.

The above mentioned feedback component from the position control loop will offset and correct any speed variations which tend to arise due to characteristics of the motive equipment, such as valves and motors, which produce speed variations in the machine tool final drive means.

The trace rate is adjustable by changing the speed of rotation of the speed portions of the ball-disc integrators. Gain stabilization is achieved by means which increases the magnitude of the electrical "speed" signal as the speed of rotation of the speed portions of the ball-disc integrators is increased.

In FIGURE 2, the instrument system also includes a pair of integrating means, shown as ball-disc integrators. In this case however, the speed input to each of the integrators is derived from an electronic network which provides an individual speed drive signal to its integrator, which individual signal is indicative of one of the quadrature components to the summed "in," "out" and "speed" signals. The output of each integrator is thus the desired rate of trace or speed along the individual quadrature axes of movement of the machine tool. The output of the integrators of FIGURE 2 are connected to a position control loop, as in FIGURE 1.

For purposes of definition, the instrument system of both FIGURES 1 and 2 can be defined as a variable speed means, controlled by the quadrature components of the sum of the "in," "out" and "speed" signals, and controlled by a speed or trace rate command, to provide two output control speeds or trace rates which vary as the sine and cosine of the phase angle of the resultant of the summed "in," "out" and "speed" signals. Thus each output control speed is indicative of a desired speed or trace rate of one of the respective axes of the machine tool.

In both FIGURES 1 and 2 the normal "out" deflection signal from the tracer head, as modified by the "in" and "out" channel modifying components 41, 42, is connected through a wave shaping and filtering network component of the conventional type indicated at 60. The channel which controls motor 24 also includes a phase discriminating network 61 to select the component of the modified deflection signal which is applicable to control motor 24 in a conventional manner to account for the physical displacement of the machine tool along axis 22. The respective signal for each channel of the machine tool is then connected to summing points indicated at 62 and 64. As will be hereinafter described, an additional positional signal will be added at these summing points, to be utilized, in part, to control the position of the respective axes motors 24, 25.

The signals from the summing points 62, 64 are connected through amplifying apparatus 66, 68 respectively to control valves 70, 72. As previously noted, the channel which controls motor 25 will be associated with and referenced electrically to the phase of the energizing signal of the tracing head to respond to that component part of the signal which is indicative of a need for operation of motor 25 to displace the table along a predetermined axis 21 or x axis, associated with a reference coordinate system of the tracer head. The opposite axis, or y axis, will be controlled by a component of the signal which is 90° displaced from the component part controlling motor 25. This component controls valve 72, to control motor 24. For purposes of the present disclosure, a continuously running motor, indicated by the block 80 operating a pump 82, will supply the hydraulic fluid to the valve means 70, 72 in the control of the respective motors 25, 24 for controlling the velocity of movement and the positioning of the table in the respective axes. Return lines are indicated generally at 85 to a storage component 88 with the return line to the pump 82. Since these details, along with the details of the valves and motors, are conventional, they are shown in block form for simplicity.

The respective quadrature components of the signal which result in energization of motors 25, 24 will provide for maintaining a constant deflection of the tracer head stylus, or a predetermined deflection of the tracer head but will not provide movement of the same along the templet.

The velocity component, to cause movement along the templet, is added by a position control loop including an instrument system, indicated generally at 100 in both FIGURES 1 and 2.

In FIGURE 1, system 100 receives its input from summing point 50 connected to summing point 110. The signal component at summing point 110 includes the head error signal with "in" and "out" components from summing point 49, added to the speed vector component from the modifying network 43, similar to the arrangement by which the speed component is introduced to tracing systems as outlined by patents referenced above. The output from summing point 110 controls the instrument system and is connected through a phase detector, shown in block at 112, which phase detector is connected to control the energization of an instrument motor 114 to move this motor in accordance with the phase of the signal which is the composite of the "in" and "out" signal as modified by the "speed" signal received at summing point 110. A resolver 116, which may be conventional in form, is connected to and driven by the output of motor 114 to provide a signal back to summing point 110 to complete this servo loop, maintaining operation of motor 114 in accordance with the phase relationship of the composite signal received from summing point 50.

Motor 114 drives a pair of cams 120, 121. Cams 120 and 121 are so displaced to be driven by motor 114, and are so shaped as to bear the relationship of sine and cosine to one another. These cams will respectively control the position control loop for the individual axes 21 and 22, in quadrature, in accordance with the relationship these cams bear to one another. The cams have included therewith followers which position balls 124, 126 of ball-disc integrators 128, 130 respectively. These integrators effect a variable speed drive in the position control loop and have associated therewith a variable speed input from a shaft 139. A further resolver in the form of a ball disk integrator 200 is provided to control the speed of rotation of shaft 139. The speed input to integrator 200 includes a constant speed motor 140. This speed input is utilized, under the control of a speed command knob 201, to control the output speed at shaft 139. A coupling 141 connects knob 201 to both the ball portion of integrator 200 and to network 48 to provide for stabilized gain as the speed command is changed. In other words, speed command knob 201, when moved to increase the speed of rotation of shaft 139, also increases the magnitude of the electrical "speed" signal provided to summing point 50. In this manner the relative size of the summed "in," "out" and "speed" signals are also changed to thereby change the response of the ball portions integrators 128 and 130 to changes in "in" and "out" signal changes, at the same time as the speed of shaft 139 is increased. Thus, stable gain results.

It should be recognized that the speed input command, shaft 139, to the instrument system and position control loop may be any type of shaft input rotation, such as a rotation from the spindle of the machine being controlled, or a rotation from other apparatus with which the subject control apparatus is to be associated.

When a shaft rotation is used as a speed command, a tachometer (not shown) on shaft 139 will supply the speed signal normally supplied by network 48. The movement of the balls 124, 126 of the integrators, through operation of the cams 120, 121, will vary the speed of the output, indicated schematically at 150, 152, for the integrators 128, 130, to control the positioning of transmitters 160, 162 of a pair of telemetering or positioning systems. The transmitters or synchros 160, 162 are energized from a reference source 163 and are interconnected in a conventional manner through conductors 164, 165 with receivers 170, 172. The rotating elements of receivers 170, 172 are mechanically connected to and driven by the motors 24, 25 respectively through mechanical connections indicated at 175, 174. Thus the receivers will provide an operational position error signal which creates an actual speed of movement of the respective drive motors 24, 25 which is equal to the desired speed of movement as determined by the output of the integrating apparatus at the transmitters 160, 162. Receivers 170, 172 provide a position signal which is connected through conductors 180, 182 to the summing points 64, 62 respectively for the channels of the motors 24, 25.

Thus, the drive motors 24, 25 will be controlled in velocity by an instrument system and position control loop. In the event that one axis tends to drive slightly faster or slower than prescribed by the then existing velocity of the other axis and by the then engaged contour of the templet, the direction of the vector or signal obtained at the summing point 50 will change. As a result, the signal received at the summing point 50 controls motor 114 and cams 120, 121 to correct for this difference in required velocities along the respective axes, as determined by the speed of shaft 139. The variable speed drives, that is shafts 150, 152, which are driven by means including the sinusoidal and cosinusoidal cams will relate the desired velocity for each axis to the actual speed of movement of the motors 24, 25 controlling speed along the respective axes 21, 22. The velocity for each axis will be proportioned to the input speed command introduced by shaft 139 into the position control loop at all times. Because the velocity components, as controlled by the cams, are affected or controlled by the position control loop, velocity errors caused in the valves 72, 70 and motors 24, 25 by leakage which vary the loads and the like, will be compensated for by the position control loop. This provides precise speed control by the use of a structure 100 whose loading is light and whose loading is constant and uniform, thus making possible wide ranges of speed control and accurate speed control in the overall operation of the machine tool.

FIGURE 2 shows a second embodiment of our invention in which the instrument and position control loop takes a somewhat different form.

In FIGURE 2 the ball-disc integrators 128 and 130 are controlled by the effect of a speed command knob 301 and by input effect which is variable with the phase and magnitude of the vector sum of the "in," "out" and "speed" signals. Specifically, the vector sum of these signals, to be found at summing point 50, is connected to an electrical network including amplifier 360 (similar in construction to the amplifier 60 of FIGURE 1) and including a network 361 which is effective to select that portion of the signals present at summing point 50 which is to be utilized to control the movement of motor 24 associated with axis 22 of the machine tool. Network 361 is similar in construction to network 61 of FIGURE 1.

In effect, the voltage present at summing point 362 is a resolved voltage, resolved from the voltage present at summing point 50 and by that component of the voltage present at summing point 50 is representative of need for movement of a machine tool along the axis 21. The voltage at summing point 364 is a similar resolved voltage, being 90° out of phase with the summing point 362, and being indicative of the movement of the machine tool which is necessary along the quadrature axis 22.

The voltage at each of summing points 362 and 364 is connected through amplifier 366 and 368 respectively to control the speed of rotation of motors 353 and 352. Tachometers 350 and 351 are connected to be driven by the output of the motors 353 and 352 respectively and the voltage output of these tachometers are connected to summing point 362 and 364 to provide accurate control of the speed of the respective motors by the quadrature command input against two amplifiers 366 and 368.

The speed of rotation of motors 352 and 353 are effective to control the speed of rotation of speed disc of the respective integrators 128 and 130.

The ball portion of the integrators 128 and 130 are controlled by the speed command knob 301 which is effective to control the speed of rotation of the output shafts 150 and 152 of these integrators, and the then existing speed of the speed disc of the integrators, as controlled by the individual resolved voltage at summing points 364 and 362. Thus, it can be seen that the speed of rotation of the speed discs at integrators 128 and 130, FIGURE 2, becomes a sine and cosine relationship to each other. In FIGURE 2 the command speed input is applied to the integrators 128 and 130 by positioning the ball portion of the integrators, whereas in FIGURE 1 the speed command input is fed into integrators by varying the speed of the speed disc, the effect upon output shafts 150 and 152 is however the same. Namely the speed of output shafts is controlled by both the quadrature components of the voltage present at summing point 50 and by the speed command.

As in FIGURE 1, the speed command knob 301 of FIGURE 2 is connected to control the magnitude of "speed" voltage produced by network 48. In this manner, the gain of deflection control loop is stabilized by increasing the magnitude of the "speed" voltage as the speed command knob 301 calls for a higher speed of trace.

The position control loop of the structure of FIGURE 2, including the two synchro systems which are connected to be driven by the final drive means 24 and 25 of the machine tool and by the output speed shafts 150 and 152 of the instrument system, are identical to the structure of FIGURE 1 and perform the same function.

Structure of FIGURE 1 and FIGURE 2 both utilize the unique concepts of providing an instrument system and a position control loop to obtain more accurate speed control and a wider range of possible speed adjustment of the associated machine tool. In FIGURE 1 the sine and cosine effect, by which the signals present at summing point 50 are resolved into quadrature components, is achieved by sine and cosine cams 120 and 121. In the disclosure of FIGURE 2 the quadrature components are driven directly as speeds of rotation of motors 352 and 353. The input to the position control loop, that is the rotation of shafts 150 and 152 of both FIGURES 1 and 2, is the composite effect of the resolved voltage at summing point 50, and thus is indicative of the phase of the voltage, and of the speed of trace command as provided by the positioning of knobs 201 of FIGURE 1 and 301 of FIGURE 2.

Other modifications of our invention will be apparent to those skilled in the art and it is intended that the scope of our invention be limited solely by the scope of the appended claims.

We claim as our invention:

1. Tracer control apparatus for use with a machine tool having drive means to produce movement along two quadrature axes of movement, comprising;

a tracer head including a member adapted to cooperate with a templet supported for movement by the machine tool, trace rate command means to control the required trace rate at which movement of the machine tool causes said tracer head member to trace the contour of the templet, means including said tracer head and said trace rate command means to provide a first and a second quadrature control effect as determined by a phase relationship established by the relationship of said tracer head member to the templet and by the required trace rate, resolving means having first input means controlled by said trace rate command means, second input means controlled by said quadrature control effects, and output means indicative of a required rate of movement of the machine tool drive means, position control means having means connected to the output means of said resolving means and having means adapted to be connected to the machine tool drive means, and means controlled by said position control means adapted to control the machine tool drive means in response to a combination of the output means of said resolving means and the machine tool drive means.

2. A control system comprising in combination:
a movable element having an initial position,
a driven member, driving means for said member,
first means responsive to the deflection of said element from said initial position for producing a first signal having a magnitude proportional to the deflection of said element and a phase relationship that varies continuously with the direction of said deflection,
control means responsive to said first signal for operating said driving means,
second means connected to said first means and responsive to said first signal for producing a second dephased signal having a phase component that varies continuously with the phase of said first signal,
third means connected to said second means and responsive to said second signal to position a sinusoidal cam in response to said second signal,
variable speed drive means controlled by said cam,
a synchro system connected to said drive means and to said driving means to provide a positional signal in relationship to the position of said drive means and said driving means,
and means connecting the positional signal of said synchro system to said control means to modify the control of said first signal on the operation of said driving means.

3. A control system comprising in combination:
a movable element having an initial position,
a pair of driven members,
driving means for each of said members,
first means responsive to deflection of said element from said initial position for producing a first signal having a magnitude proportional to the deflection of said element and a phase relationship that varies continuously with the direction of said deflection,
control means responsive to said first signal for operating independently each of said driving means,
means connected to said first means and responsive to said first signal for producing a second dephase signal having a phase component that varies continuously with the phase of said first signal,
third means connected to said second means and responsive to said second signal to position a sinusoidal cam and a cosinusoidal cam in response thereto,
a pair of variable speed drives individually controlled by said cams,
a pair of positional control systems each connected respectively to one of said driving means and to one of said variable speed drives to provide a pair of positional signals in relationship to the position of said driving means and said variable speed drives,
and means connecting the respective positional signal from said positional control systems to said control means to modify the control of said first signal on the operation of each of said driving means.

4. A control system comprising in combination;
a movable element having an initial position,
a pair of driven members,
driving means for each of said members,
first means responsive to the deflection of said element from said initial position for producing a first signal having a magnitude proportional to the deflection of said element and a phase relationship that varies continuously with the direction of said deflection,
control means responsive to said first signal for operating independently each of said driving means,
second means connected to said first means and responsive to said first signal for producing a second dephased signal having a phase component that varies continuously with the phase of said first signal,
third means connected to said second means and responsive to said second signal to position sinusoidal and cosinusoidal cams in response to said second signal,
a pair of ball disc integrators having output speed means controlled by said cams,
a pair of positional control systems each connected respectively to one of said driving means and to the output speed means of one of said integrators to provide a pair of positional signals in relationship to the position of said driving means and said cams,
and a feedback loop from each of said positional control systems connecting the respective positional signals to said control means to modify the control of said first signal on the operation of each of said driving means.

5. Tracer control apparatus for use with a machine tool having individual drive means to control movement along two mutually perpendicular axes, comprising;
a tracer head including a member adapted to follow the contour of a templet which is supported for movement by the machine tool,
means including said tracer head to generate a first signal of a variable magnitude which is dependent upon the extent of deviation of said tracer head from the templet and of a variable phase which is dependent upon the direction of such deviation,
means controlled by said first signal to generate a trace rate signal of a magnitude which is dependent upon a desired rate of trace of said tracer head along the contour of the templet and of a phase which is displaced from and dependent upon the phase of said error signal,
further means controlled by said first signal to generate an error signal of a variable magnitude which is dependent upon the departure of said tracer head from a desired deviation and of a variable phase which is dependent upon the direction of such departure.
phase responsive means having an input controlled by the vector sum of said error and trace rate signals and having a pair of quadrature related outputs which bear a relationship to each other as the sine and cosine of the phase angle of vector sum of said error and trace rate signals,
a first and a second resolving means, each of which has a first input controlled by one of the pair of outputs of said phase responsive means, a second input controlled in accordance with the magnitude of said trace rate signal, and an output which is instantaneously indicative of a required position of the individual drive means of the machine tool as required by said error and trace rate signals,
first and second synchro means, each having a portion connected to the output of one of said resolving means, and having a portion adapted to be connected to one of the individual drive means of the machine tool to provide a position signal for each axis of the machine tool,
means controlled by said error signal having a pair of quadrature related error output signals indicative of the quadrature components of said error signal,
and means controlled by said quadrature output signals and by said position signals and adapted to control the drive means of the machine tool.

6. In a tracer control apparatus of the type having means to generate a tracer displacement error signal of a magnitude dependent upon the positional deviation of a tracer from a desired position, and of a phase dependent upon the direction of such displacement relative to the rectilinear coordinate system of movement of an associated machine tool, and having trace command means to generate a trace rate signal of a magnitude indicative of a required trace rate and of a phase displaced 90° from the phase of the error signal, the improvement comprising;
means connected to be controlled by the error signal to generate two quadrature error signals of magnitudes indicative of the extent of rectilinear movement of the machine tool which is necessary to reduce the error signal substantially to zero, means connected to be controlled by the magnitude of the trace rate signal and by the phase of the vector sum of the error signal and the trace rate signal, and to generate two quadrature trace rate output signals indicative of the extent of rectilinear movement of the machine which is necessary to produce the required trace rate, a first and a second position comparing means, each having a first portion controlled by one of said trace rate output signal, each having a second portion controlled by one of the rectilinear coordinates of movement of the machine tool, and each having an output positional error signal indicative of an error in instantaneous position of the machine tool, and a pair of machine tool movement control means, each of which is connected to be controlled by one of said positional error signals and one of said quadrature error signals.

7. A machine for tracing a contour displayed by a templet, comprising;

a templet carrying support, a tracing head adapted to cooperate with the templet, means mounting said support and said tracing head for relative movement with respect to each other about a pair of axes, motive drive means for each axis producing said relative movement, output means, means including said tracing head for introducing an error signal into said output means that is variable in phase and variable in magnitude depending upon the direction and extent of deflection of a portion of said head away from the templet, means for introducing a speed signal into said output means to provide for movement of said tracing head in a direction tangential to the templet, a control loop connected to and responsive to said output means for positioning a pair of cams in response to said error signal as modified by said speed signal, a variable speed drive for each of said axes, means providing a speed input signal, means placing said speed input signal and said cams in controlling relation to each of said variable speed drives to control each of said variable speed drives by the position of one of said cams and by said speed input signal, a pair of synchro positional systems each of which includes a first synchro operated by one of said variable speed drives and a second synchro operated by one of said motive drive means and connected to said first synchro to provide a positional signal in accordance with the relationship of the position of one of said cams with respect to one of said motive drive means, a second control loop connected to each of said motive drive means for controlling the same and connected to be controlled by said means including said tracer head, and a feedback loop from each of said synchro positional systems connecting the positional signal therefrom to said second control loop to modify the control of its motive drive means with a speed component to correct for positional error in the operation of its motive drive means.

8. A machine for tracing a contour displayed by a templet, comprising:

a templet carrying support, a tracing head adapted to cooperate with the templet, means mounting said support and said tracing head for relative movement with respect to each other along a pair of axes, a pair of motive drive means, each of which is associated with one of said axes for producing said relative movement, means including said tracing head to provide a first signal that is variable in phase and in magnitude depending upon the relationship between said head and the templet, said first signal providing for relative movement normal to the templet, means to provide a speed signal that is variable in phase depending upon the relationship between said head and the templet, said speed signal providing for relative movement tangential to the templet, phase control means connected to receive said first signal and said speed signal and to provide a pair of output functions which vary as the sine and cosine respectively of the vector sum of said first signal and said speed signal, a pair of variable speed drive means, each of which is connected to be controlled by one of said output functions, a pair of position comparing means, each of which includes a first portion operated by one of said variable speed drive means and a second portion operated by the motive drive means associated with one of the axes of relative movement, said comparing means providing a pair of position signals in accordance with the position relationship of said variable speed drive means and said motive drive means, drive control means connected to control said motive drive means and connected to be controlled by said first signal, and position control means connected to said drive control means to provide position control signals to control said motive drive means.

References Cited by the Examiner

UNITED STATES PATENTS 2,962,645 11/1960 Rudolph et al. _____ 323—51
3,007,096 10/1961 Tripp _____ 318—162

ORIS L. RADER, *Primary Examiner.*

B. DOBECK, *Assistant Examiner.*